(12) United States Patent
Park et al.

(10) Patent No.: US 7,052,726 B2
(45) Date of Patent: May 30, 2006

(54) METHOD OF PASTEURIZING CHICKEN SHELL EGG

(75) Inventors: Joong-Min Park, Goyang (KR); Yong-Sik Cho, Suwon (KR)

(73) Assignee: Safe Food Corporation (KR)

( * ) Notice: Subject to any disclaimer, the term of this patent is extended or adjusted under 35 U.S.C. 154(b) by 62 days.

(21) Appl. No.: 10/250,526

(22) PCT Filed: Oct. 30, 2002

(86) PCT No.: PCT/KR02/02016

§ 371 (c)(1),
(2), (4) Date: Jun. 30, 2003

(87) PCT Pub. No.: WO03/037092

PCT Pub. Date: May 8, 2003

(65) Prior Publication Data

US 2004/0058040 A1    Mar. 25, 2004

(30) Foreign Application Priority Data

Nov. 2, 2001    (KR) .................... 10-2001-0068140

(51) Int. Cl.
*A23L 1/32*    (2006.01)

(52) U.S. Cl. ...................... 426/298; 426/614

(58) Field of Classification Search ................. 426/614, 426/298
See application file for complete search history.

(56) References Cited

U.S. PATENT DOCUMENTS

| | | | |
|---|---|---|---|
| 5,843,505 A | | 12/1998 | Davidson |
| 5,993,886 A | | 11/1999 | Polster |
| 6,103,284 A | * | 8/2000 | Polster ................. 426/298 |
| 6,165,538 A | * | 12/2000 | Davidson ............... 426/614 |
| 6,303,176 B1 | * | 10/2001 | Vandepopuliere et al. .. 426/614 |

FOREIGN PATENT DOCUMENTS

| | | |
|---|---|---|
| JP | 2001-245584 | 9/2001 |
| WO | WO 95/18538 | 7/1995 |

* cited by examiner

*Primary Examiner*—Anthony Weier
(74) *Attorney, Agent, or Firm*—Blakely Sokoloff Taylor & Zafman

(57) ABSTRACT

The present invention provides a method of pasteurizing an in-shell chicken egg comprising measuring the lowest temperatures of albumen and yolk on time and their location according to a prescribed method, and maintaining the lowest temperatures at the pasteurization temperature or higher for the necessary time. The method increases the stability of the egg as a food product, extends egg life, and improves the quality of albumen and yolk in the in-shell egg. Also the method reduces a problem of weight loss caused by pasteurizing *Salmonella* in the shelled egg.

14 Claims, 9 Drawing Sheets

METHOD OF PASTEURIZING CHICKEN SHELL EGG

The present patent application is a non-provisional application of International Application No. PCT/KR02/02016, filed Oct. 30, 2002.

CROSS REFERENCE TO THE RELATED APPLICATION

This application is based on the Korean Patent Application No. 2001-0068140 submitted to the Korean Intellectual Property Office on Nov. 2, 2001, the disclosure of which is incorporated herein by reference.

BACKGROUND OF THE INVENTION (a) Field of the Invention

The present invention relates to a method of pasteurizing in-shell eggs. More specifically in the present invention, yolk and albumen of in-shell eggs are pasteurized separately during the process of a series of pasteurizations of the *salmonella* (bacteria inhabiting in eggs with shells) by heating it to a desired level, while various temperature measuring points are established within the egg and according to such measuring points, the lowest temperature of the yolk and albumen are measured through the previous pasteurization process. And having this lowest temperature as the standard, the necessary time needed for pasteurization above this lowest temperature is standardized, in order to have the yolk and albumen to be pasteurized simultaneously.

(b) Description of the Related Art

There has been immense research and effort regarding the pasteurization of *salmonella*—which generally inhabit inside an egg, and in particular, in the case of the liquid egg (liquid white, liquid yolk and liquid whole egg) masses have been produced even commercially since several decades ago. Several nations already hold the standard regarding pasteurizing liquid egg, and its safety has also been substantiated.

The shell egg (its main ingredients being the egg shell, yolk, and the albumen, the egg shell takes up 10~20%, the albumen takes up 55~63%, and the yolk takes up 26~33%), an egg with an egg shell, is not simple to pasteurize due to the complexity of its features, weight, size, form, difference in thermal conductivity and the existence of the egg shell. Moreover, in the commercial front, immense research and effort is attempted regarding pasteurization, and as safety having its priority in quantity and taste serves as a top factor in food consumption of the present, and additionally, as the nations of the global arena stress importance of the safety of livestock from mad cow disease, foot-and-mouth disease, and so forth, there is a demand for the research and interest in the development of shell egg pasteurization.

There are two ways in which the *salmonella* can be contaminated; one being the contamination into the interior of an egg through the pore of a medium surrounding an egg-laying facility after the egg is laid, and the other being the contamination from the layer before the egg is laid. In the case of the former contact contamination through the pore, it is contaminated due to the fact that generally, eggs possess around 7,00~17,000 pores for respiration and the *salmonella* can easily pass through it. In the case of the latter, deeper parts of an egg's yolk and albumen is contaminated due to the contamination of the layer's interior of the body before the egg shell is formed. Both the former and latter are contaminated into the interior of the egg, thus making pasteurization difficult. The most dangerous sort of *salmonella* being the *Salmonella Enteritidis*(SE), an egg contaminated with it must be pasteurized in all parts of its interior due to the fact that the *Salmonella Enteritidis*(SE) contaminates the interior of an egg and deeper into the yolk and albumen inside the egg shell through a layer's internal organs which were already contaminated.

When pasteurizing through heating according to an egg's characteristics (pH concentration, temperature of the interior, weight, size, composition, specific gravity, form, thickness of the egg shell, difference in breed and so forth) and the pasteurization environment (means of heating, heating medium, method of heating, temperature of egg in the early stage and so forth), not only is an egg's temperature different in various locations the temperature amount precedence also changes depending on the time difference. Consequently, the complete pasteurization of the *salmonella* inhabiting in the egg's interior is difficult.

When pasteurizing an egg through heating, it must be done to the level of safeness as a food product and maintain the quality and distinctiveness of the egg as a food in terms of the yolk and albumen's solidification. Should an egg be pasteurized through heating at a high temperature for an extended time, it is satisfactory in terms of safeness yet is incongruous as a food product with damages in the function and solidification of the albumen and so forth. On the other hand, pasteurization in a low temperature for a short period of time is satisfactory as a food yet incongruous in the sense of safeness, and the pasteurization for a short period of time in a high temperature will damage the egg shell and cause problems in the albumen's ripening and solidification. Moreover, pasteurization in a low temperature for an extended time produces low work efficiency and the gelation, in which the yolk and albumen switch form liquid to solid and thus holds a problem in that it is not easy to pasteurize the shell egg. The shell egg is composed of the egg shell, yolk, and albumen the pasteurization of it is difficult due to the distinctiveness of each material, the solidification by heat and the difference of heat conductivity, the solidification and damage in the function of the yolk and albumen when heated, and the damage of the egg shell and the changes in the condition of the pasteurization when a lapse in the egg laying time affects the albumen's pH concentration.

Much research has been done on the pasteurization of the shell egg and it was thought obvious that when pasteurizing through heating, all parts of an egg had the same temperature, ignoring the fact that they are different, or that the pasteurization of one part of an egg's interior (the center part of the yolk) would sufficiently pasteurize the entire egg. For example, in U.S. Pat. No. 6,165,538, the center of the yolk is set as the standard in determining the pasteurizing time and temperature, and with a presumption that the pasteurization of the center of the yolk will sufficiently pasteurize the entire egg, the pasteurizing conditions are set.

However, when pasteurizing shell egg through heat, the temperatures of the shell egg's interior are different as time goes by according to the condition of the egg, the means of heating and the amount of heating. There are even some instances where the central yolk part's temperature is higher, thus not pasteurizing the yolk's exterior even if the central part of the yolk is pasteurized and the albumen may not be pasteurized even yolk may be pasteurized. Therefore, generally when pasteurizing with a heating medium, the temperature of the yolk and albumen of an egg's interior will be different according to the time and measuring points. This produces the problem of ov r pasteurization and under pasteurization. Moreover, when shifting an egg in two or more heating media, the yolk and albumen's temperature will abruptly fall. In this instance, the central part of the yolk is pasteurized above the arranged pasteurizing temperature but exterior part of yolk breaks away from the arranged temperature without pasteurization. In severe cases, the albumen's temperature fall is more abrupt and while the yolk's pasteurization remains above the arranged pasteurizing temperature, the albumen will not be pasteurized as it has broken away from the arranged temperature.

Therefore, pasteurization of the yolk does not surely ensure the pasteurization of the albumen nor does the pasteurization of a part of or the central part of the yolk ensure the pasteurization of another part of the yolk or entire part of the egg. Due to these problems, the need for pasteurization by having the lowest temperature of the yolk and albumen as the standard in the entire pasteurizing procedure (including the refrigerating process) is prominent.

SUMMARY OF THE INVENTION

The present invention relates to the following in the pasteurization of shell egg with a heating medium.

After setting various temperature measuring points inside an egg's yolk and albumen, the lowest temperature points are set among those measuring points through the whole pasteurization procedure. The temperature of the lowest temperature point is maintained in the required pasteurizing time above the planned pasteurizing temperature. The yolk and albumen consequently are simultaneously pasteurized.

The present invention relates to a method in which the lowest temperature point is the point of the lowest amount out of at least three different temperature points of each of the yolk and albumen.

Moreover, the mentioned lowest temperature point makes extended imaginary lines that connect the centers of the largest and the smallest sphere that circumscribe the egg shell and the yolk to the yolk's center.

The two most closest points of the albumen from the yolk are set on the imaginary lines and the two most closest points of the albumen from the egg shell are set on the extended imaginary lines and the center points of the two spheres are also set. These points are the albumen's temperature measuring points and the point with the lowest temperature measured is selected as the lowest temperature point. The two points of the yolk that are closest to the albumen on the imaginary lines are set. These two points of the yolk, the two central points between the yolk's center point and the above two points of yolk and the yolk's center point are set as the yolk's temperature measuring points. The lowest temperature measured from these temperature measuring points is selected as the yolk's lowest temperature point.

This concerns the pasteurization method of shell egg in which the feature is that through the pasteurizing process the temperatures of the above mentioned lowest temperature points of the yolk and albumen are measured periodically at different times. Having these lowest temperatures as the standard, the pasteurizing temperature and the time needed to maintain the pasteurizing temperature is determined.

The present invention concerns the pasteurizing method which includes the following pasteurizing stage. During the pasteurizing process, should problems disable pasteurizing by cracks or a break away in the pasteurizing process or condition occur, the pasteurizing range is enlarged at the temperature of 54° C.~100° C. at 5~300 minutes. The eggs are vertically loaded in one stack or more in two eggs or more and rotated up and down at over 180 degrees inside or outside the heating medium. Yet the rotating must not exceed 720 degrees in one direction and must intersect to spin in the opposite direction.

Figure 1:
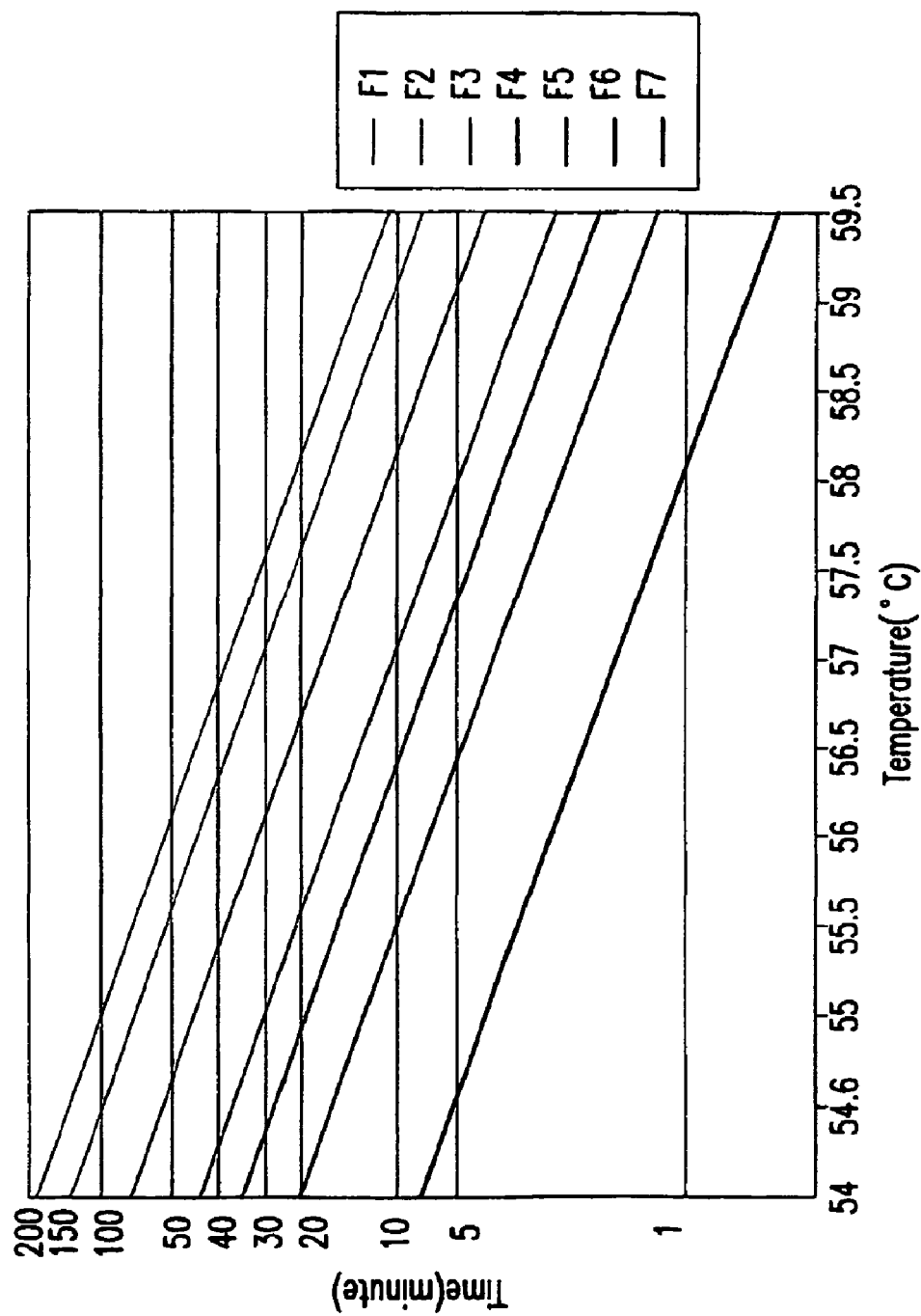
FIG. 1 is a graph that concerns the range of temperature and time for the destruction of the *salmonella* according to the pasteurization level applied to the present invention.

REFERENCE NUMBERS OF THE DRAWINGS' PRINCIPAL PARTS 1. egg (shell egg)
2. shell
3. albumen
4. yolk

DETAILED DESCRIPTION AND THE PREFERRED EMBODIMENTS

In the pasteurization of an egg with a shell, the present invention pasteurizes simultaneously the *salmonella* inhabiting in the yolk and albumen. Following a prescribed method, the temperature measuring points of the yolk and albumen are selected and having the level of pasteurization time is fulfilled. This is done in order to prevent the occurrence of a yolk or albumen partly not being pasteurized or the damaging of the yolk or albumen material function due to excessive pasteurization.

The changes in the means of heating or the kind or number of the heating medium, heating method, size, weight, and form of the egg, time passed following the laying of the egg, temperature of storage, the initial temperature of an egg when it first enters the heating medium, and the occurrence of a washing process does not make the temperature of the yolk and albumen fixed. Also, the means of heating or the method, temperature or amount of the heating medium is separate from an egg's pasteurization. This is because the pasteurization is done according to the yolk and albumen's temperature and time it takes to maintain this temperature. This in turn is due to the fact that through the entire pasteurization process, the temperature and the time needed to maintain this temperature required by the level of pasteurization must be planned by the yolk and albumen's lowest temperature.

In this detailed application, the term 'pasteurization' does not hold the implication of th destruction of pathogenic bacteria yet the general meaning of destroying the *Salmonella Enteritidis* (SE). Generally when considering the destroying conditions of harmful microorganisms the pasteurization of the SE can ensure not only the pasteurization of the *salmonella* but also other harmful germs.

The pasteurization method of a shell egg according to the present invention is described in more detail referring to the drawings.

Figure 2:
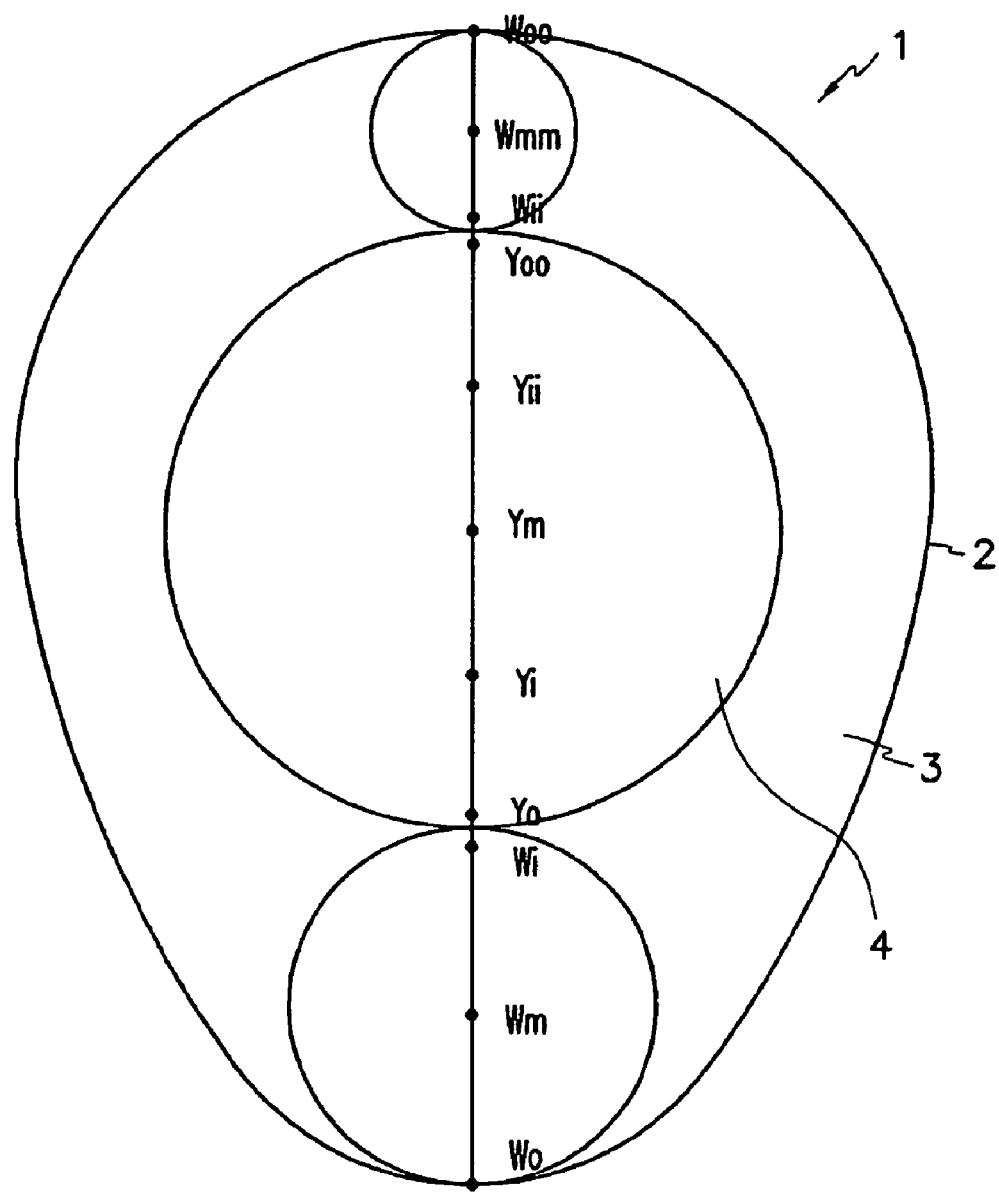
FIG. 2 is an exemplification that illustrates the measuring the yolk and albumen's lowest temperature standard point for that is applied to the present invention.
Figure 3:
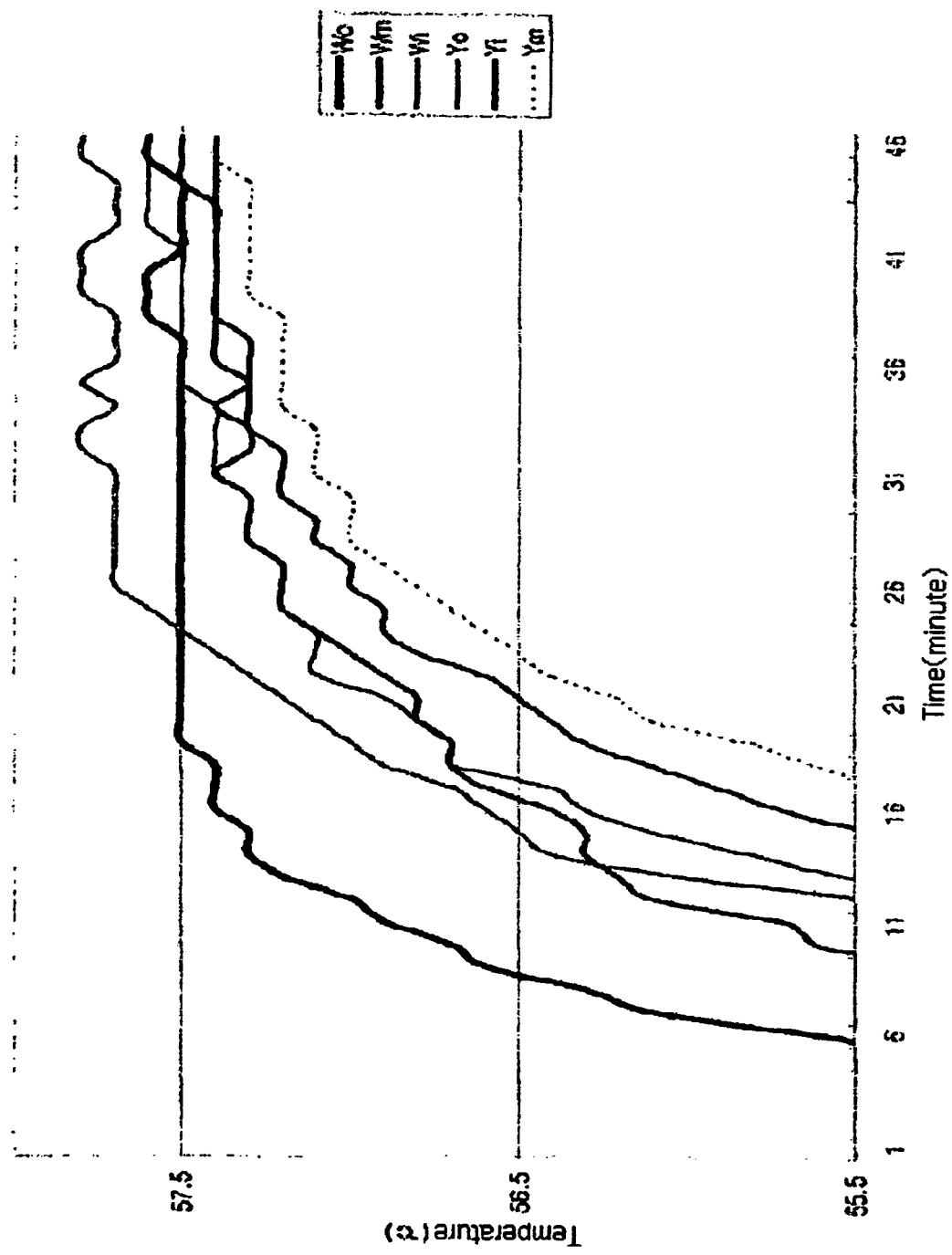
FIG. 3 is a graph that illustrates the temperature changes in the yolk and albumen according to the time in the measured points after they are heated.
Figure 4:
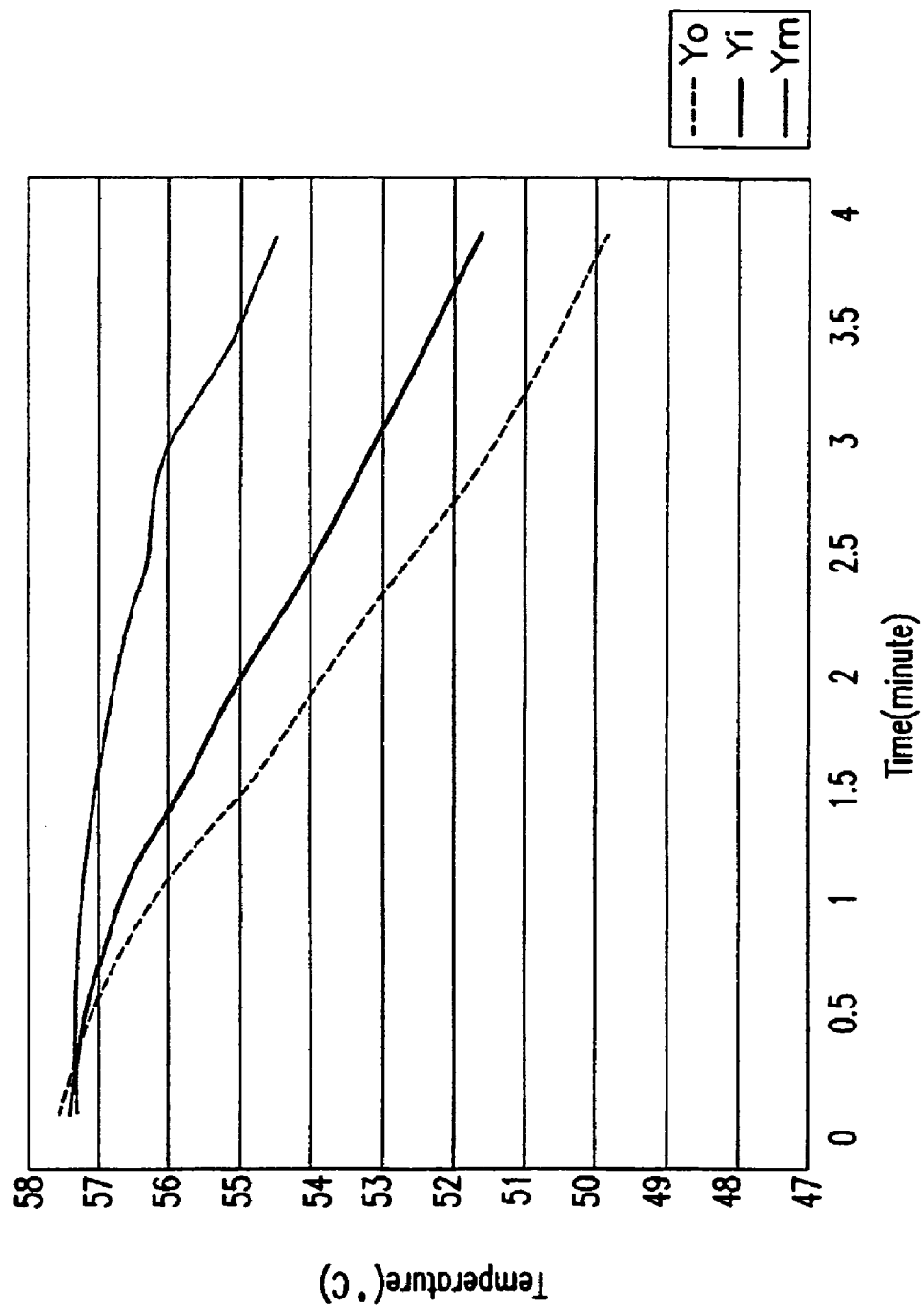
FIG. 4 illustrates the temperature changes in the yolk according to the time in the measured points when they are refrigerated.
Figure 5:
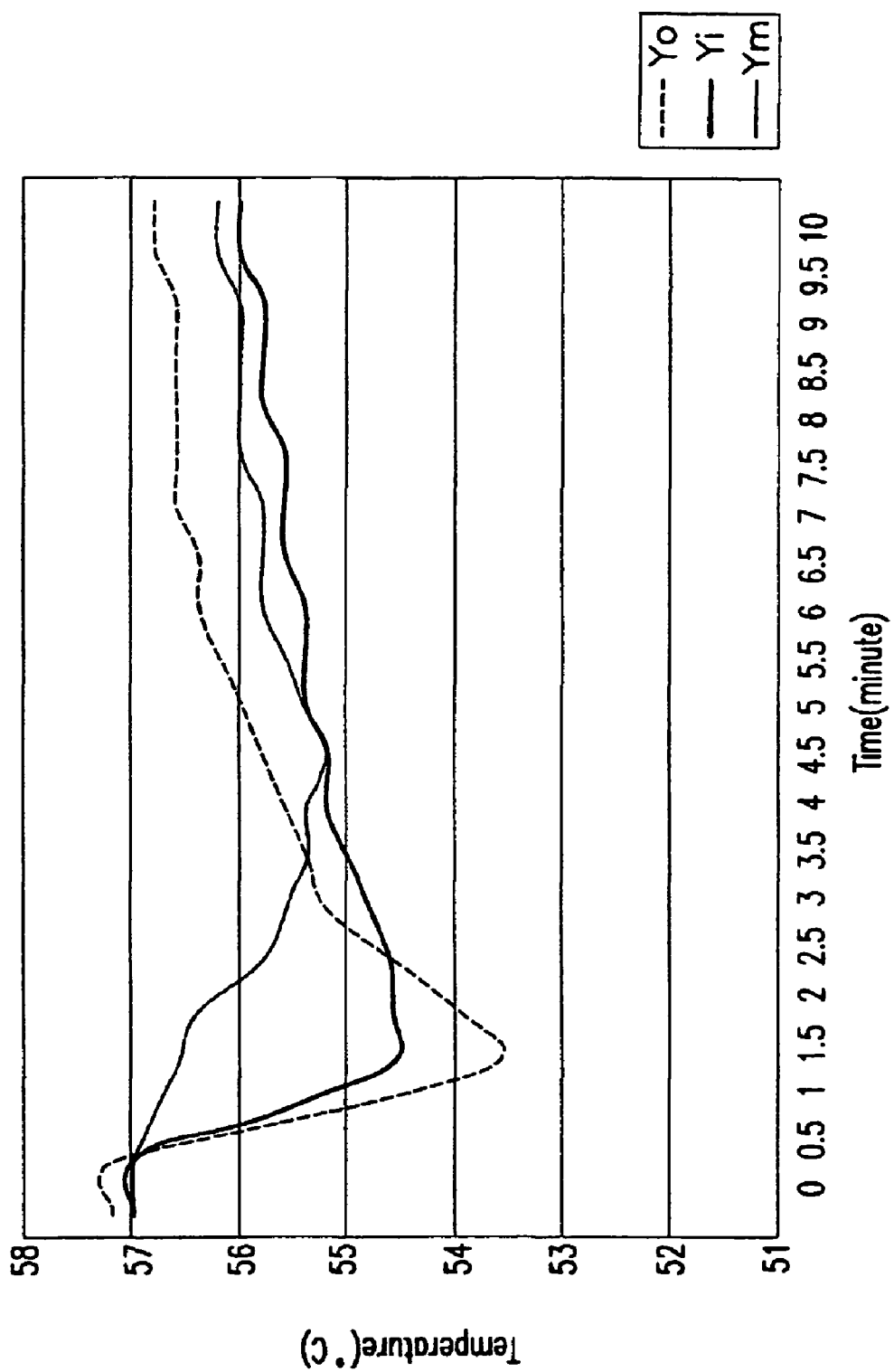
FIG. 5 is a graph that illustrates the temperature changes of the yolk according to the time when eggs are shifted among heating mediums.
Figure 6:
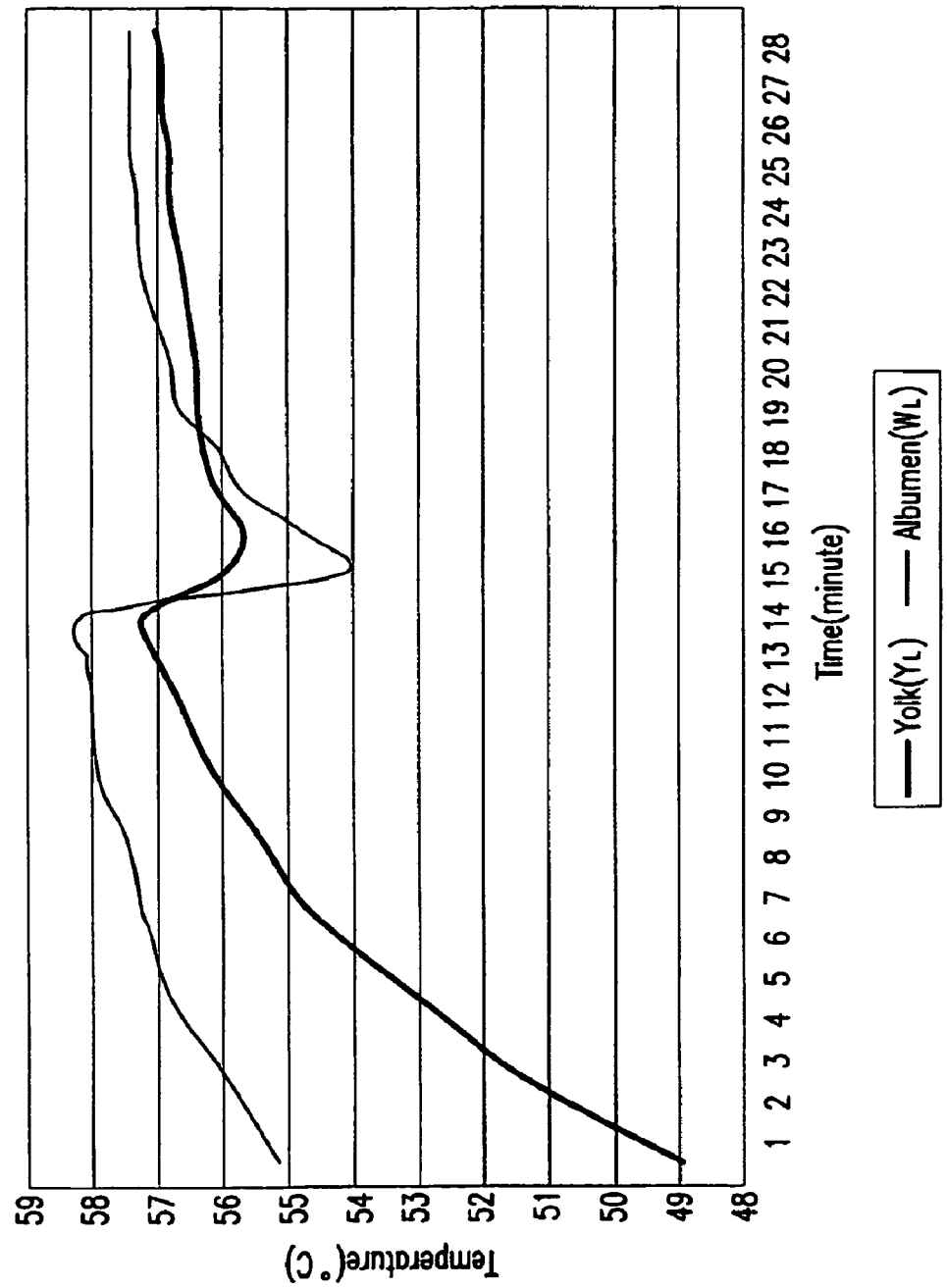
FIG. 6 is a graph that illustrates the changes in the lowest temperature of the yolk and albumen according to the time.

FIG. 1 is a graph that concerns the range of temperature and time for the destruction of the *salmonella* according to the pasteurization level applied to the present invention. FIG. 2 is an exemplification that illustrates the measuring the yolk and albumen's lowest temperature standard points for that is applied to the present invention. FIG. 3 is a graph that illustrates the temperature changes in the yolk and albumen according to the time in the measured points after they are heated. FIG. 4 illustrates the temperature changes in the yolk according to the time in the measured points when it is refrigerated. FIG. 5 is a graph that illustrates the temperature changes of the yolk according to the time when egg is shifted among heating mediums. FIG. 6 is a graph that illustrates the changes in the lowest temperature of the yolk and albumen according to the time. FIG. 7 is a graph that illustrates the condition changes in the eggs that have been pasteurized with the present invention, and general eggs that have not.

FIG. 1 is a graph that concerns the range of temperature and time for the destruction of the *salmonella* according to the pasteurization level applied to the present invention.

As illustrated in the FIG. 1, the yolk being line F3 and the range above-thus the range between line F1 and F3 The albumen being line F7 and the range above-thus the range between F4 and F7. This represents the required temperature and the time needed to maintain this temperature in order to pasteurize the *salmonella* inhabiting inside the yolk and albumen at a level of 5 LOG to 12 LOG.

The pasteurization level mentioned above has its range at a pasteurization level of 5 LOG (decreased to $\frac{1}{10^5}$ from initial number) to 12 LOG (decreased to $\frac{1}{10^{12}}$ from initial number). F1, F2, F3, F4, F5, F6 and F7 are the thermal death curves of the *salmonella*. F1 represents the time and temperature it takes for the yolk to destroy the *salmonella* at the pasteurization level of 12 LOG. F2 represents the time and temperature it takes for the yolk to destroy the *salmonella* at the pasteurization level of 9 LOG. F3 represents the time and temperature it takes for the yolk to destroy the *salmonella* at the pasteurization level of 5 LOG. F4 represents the time and temperature it takes for a pH 8 albumen to destroy the *salmonella* at the pasteurization level of 12 LOG. F5 represents the time and temperature it takes for a pH 8 albumen to destroy the *salmonella* at the pasteurization level of 9 LOG. F6 represents the time and temperature it takes for a pH 8 albumen to destroy the *salmonella* at the pasteurization level of 5 LOG. F7 represents the time and temperature it takes for a pH 9 albumen to destroy the *salmonella* at the pasteurization level of 5 LOG. The following is the locus according to the time (minutes; t) and temperature (Celsius; T)

$F1: \log(t) = 14.43121 - 0.224889 * T$ $F2: \log(t) = 14.30389 - 0.2251287 * T$ $F3: \log(t) = 14.06163 - 0.2252666 * T$ $F4: \log(t) = 13.81366 - 0.2250048 * T$ $F5: \log(t) = 13.68152 - 0.2248754 * T$ $F6: \log(t) = 13.52736 - 0.2258101 * T$ $F7: \log(t) = 13.05205 - 0.2251104 * T$ As the egg respires through the pores on its egg shell, it discharges carbon dioxide. During this process there is nearly no change in the yolk yet the pH concentration in the albumen increases. The *salmonella*'s thermal resistance and destruction rate changes according to this pH concentration. The pasteurization of the albumen differs in the temperature and time according to the pH concentration even at the same level of pasteurization, the lower pH concentration is the more pasteurization time needed at the same temperature. Moreover at the same time period, the lower pH concentration is the higher pasteurization temperature is needed.

The 7.6 to 7.9 pH concentration of an egg that has just been laid rapidly increases to pH 9 in 1~3 days. Most commercial eggs have a pH concentration of 8 or more. While the pH concentration of the albumen is 8.0 or more when grading, packaging, shipping, and circulating the yolk's pH concentration does not change greatly around 6 as it does not discharge carbon dioxide.

The present condition is that most eggs are graded, under strict quality inspections by the country, and that consumers are likened to fresh eggs. This makes the packaging and circulation occur shortly after the egg has been laid. Since F4, F5, and F6 have the pasteurizing condition of the albumen's pH concentration being 8, it would be desirable. If the egg is kept in a grading and packing center or a processing facility for an extended period of time, the pasteurization at the level of 5 LOG the albumen that has reached pH 9 can increase its range temperature and time to F7.

If the albumen's pH concentration exceeds 9 the eggs that are below (pasteurization of albumen above pH 9) that level are, unless not intentional, the yolk pasteurization automatically fulfills that level of albumen pasteurization. Thus, F7 is the true lowest (in the most weak range) pasteurization range of the albumen.

The locus (F1, F2 . . . F7 ) of FIG. 1's temperature and time needed for pasteurization at the temperature according to the pasteurization level was obtained from experiments data using SAS Software package at a significance level of 95% ($p < 0.05$) on the basis of the standards commercialized in liquid eggs in Korea and abroad, D-value(refers to decimal reduction time. This is the amount of time that it takes at a certain temperature to kill 90% of the organisms being studied), Z-value (the temperature change according to D-value's tenfold change) and pasteurization theory. The pasteurization standard is this locus of the temperature and time.

Pasteurization inspection is done by artificially injecting the SE inside the shell eggs and following pasteurization, they are cultured in two ways, one in LB agar, SCP, and Rambach agar at 37 degrees each for 24 hours, the other in BPW (Buffered peptone water), SCP, and Rambach agar at 37 degrees each for 24 hours. The cultured eggs were given a positive PCR inspection.

Range of Temperature for Pasteurization

When pasteurizing a shell egg by heating with the use of a means of heating, the heating temperature will have limitations, and the albumen and yolk will start to solidify at around 61±1° C. and 65±1° C. respectively. In order for the albumen to reach the planned pasteurization range of 54° C.~59.5° C., the egg ne ds to have direct or indirect contact with a heating medium with a temperature exceeding that in the least. at 59.5° C. or above, the albumen near the shell rapidly increases in its solidifying rate, and in order to reduce the pasteurization process the heating medium needs to pasteurize at a high temperature (60° C. or above) from the beginning. Even in this situation the solidification of the albumen near the shell, the damaging of the yolk and albumen, and the shell's breaking occur rapidly and therefore the pasteurization temperature range is limited to 59.5° C. or below.

At this time, when pasteurizing at a low temperature the production efficiency declines due to the long processing time. Although the problem of the damaging of the shell is improved, the problem of gelation occurs. This situation has a high rate of occurring when the albumen is at around 54° C. for 194 minutes or more.

When pasteurizing the yolk at 54° C. at the level of 12 LOG, the pasteurization takes around 194 minutes and considering the time it takes for the yolk to reach this planned temperature, it takes 194 minutes or more in the least. Thus, when the yolk and albumen exceed 194 minutes at 54° C. or more in the least, the gelation increases. This differs according to the condition of the egg, yet occurs at more than 30% and therefore it is wise to set the pasteurization temperature range at 54~59.5° C. It is wiser to pasteurize at between 55° C. or more and 58.5° C. or below when considering the solidification of the yolk and albumen, minimizing function damage, gelation of the albumen, and breaking of the shell. The wisest would be at 56.5±1° C.

Time Range

For the range of the time for pasteurization, the shortest time will have the pasteurization level at 5 LOG and the albumen's pH concentration at 9. When both the yolk and albumen's lowest temperature reaches 59.5° C. the temperature must be adjusted so that the lowest of three points measured according to the invention of the yolk and albumen does not break away from this lowest temperature. The pasteurization is complete 4.56 minutes after the yolk reaches the assigned temperature and as for the albumen, after 0.46 minutes.

Similarly, in the case of the longest time will have the pasteurization level at 12 LOG and the albumen's pH concentration at 8. When both the yolk and albumen's lowest temperature reaches 54° C. the temperature must be adjusted so that the lowest of 3 points measured according to the invention of the yolk and albumen does not break away from this lowest temperature. The pasteurization is complete 194 minutes after the yolk reaches the assigned temperature and as for the albumen, after 46.1 minutes.

The lowest temperature mentioned above is the temperature of each hour when pasteurizing and the maintaining time for the planned temperature during the refrigeration process is included. The pasteurization time range is one that fulfills both the yolk and albumen; the pasteurization time being 4.56 minutes at 59.5° C. in the lowest level of 5 LOG, and 194 minutes for 54° C. in the highest level of 12 LOG. This is the actual time required following the reaching of the planned temperature.

Temperature and Time Range

When viewing the temperature and time range of pasteurization, the temperature is 54~59.5° C. and the time in which the pasteurization of both the yolk and albumen are fulfilled within the temperature range mentioned earlier is 4.56~194 minutes. The time and temperature set in the range above F3 is the pasteurization range of the yolk, and the time and temperature set in the range above F7 is the pasteurization range of the albumen. Yet when pasteurization is done at the farm shortly after the egg has been laid, the albumen's pasteurization range expands to the time and temperature locus that fulfills LOG (time; minute)=13.82085−0.2246819* (temperature; Celsius)

At this time, the time for preparation process for pasteurization, the time it takes to reach the planned temperature, and the required time of pasteurization including refrigeration or the time for coating process extends the whole pasteurization processing time. This whole pasteurization processing time will differ according to the egg condition which is the size, preservation temperature, pH concentration, means of heating, heating medium, and method of heating.

FIG. 2 is an exemplification that illustrates the measuring the yolk and albumen's lowest temperatur standard points for that are applied to the pr sent invention.

In the pasteurization of shell eggs according to the present invention, the core part is that the lowest temperature of an egg's interior is measured, and in order to have this temperature reach a certain-pasteurization level the time must be maintained. Yet because of the material characteristics of the yolk and albumen, a temperature difference occurs and in each case a temperature difference occurs according to the points. So if the lowest temperature is not measured accurately, a problem with an egg being only partly pasteurized occurs. Therefore, the present invention presents the method to measure the lowest temperature according to the points.

The lowest temperature presented by the present invention conceives the idea of the lowest of 3 temperatures in each of the yolk and the albumen. The lowest temperature measuring point is not a point determined by random. When pasteurizing, it does not matter whether the location of the egg's round region, which has the air cell, is at the top, bottom, or horizontally. It would be wisest to have the air cell face the top and hold the egg in a perpendicular position. In this instance, as illustrated, after selecting the largest sphere out of the spheres circumscribing the egg shell and yolk from the albumen, have that sphere's center as Wm and the yolk's center as Ym. Connect Wm and Ym with a straight line and extend the line on both sides and on the line, have the albumen's point which is closest to the yolk as Wi. Also, have the albumen's point which is closest to the egg shell as Wo. Suppose that the yolk's point closest to Wi is Yo and Yi is the center point of Yo and Ym. Then, Ym, Yo, Yi and Wm, Wo, Wi are set as the standard for measuring the lowest temperature when pasteurizing.

Additionally, having Ym as the standard, have the points that are symmetrical to Yi and Yo on the straight line as Yii and Yoo. After selecting the smallest sphere that circumscribes the shell and yolk, have the sphere's center as Wmm and the yolk's center as Ym. Connect Wmm and Ym with a straight line and extend the line on both sides. When supposing that the albumen's point closest to the egg shell as Woo, closest to the yolk as Wii, Ym, Yoo, Yii and Wmm, Woo, Wii are set as the standard for measuring the lowest temperature when pasteurizing. However, the sphere mentioned above does not share any points with the air cell.

Through the pasteurizing process, the yolk and albumen become a single or multiple lowest temperatures out of Ym, Yo, Yi and Wm, Wo, Wi respectively. Yet in general it does not occur when a certain point of the yolk or albumen stagnates or falls at the same temperature. The temperature after this moment in the case of the yolk would be Ym, Yo, Yoo, Yi, Yii and in the case of the albumen would be Wm, Wmm, Wo, Woo, Wi, Wii. Out of these, the point with the lowest temperature becomes the single or multiple lowest temperatures.

When measuring 3 or more points as the lowest temperature, the conditions for measuring the lowest temperature are as follows.

Have the point that corresponds to Wo as W1, and as it goes toward the Ym direction have it go as W2, W3, W4, ... Wm, Wm+1, Wm+2, ... Wi. Have the point that corresponds to Woo as W11, and as it goes toward the Ym direction have it go as W22, W33, W44, ... Wmm, Wmm+1, Wmm+2, ... Wii. Have the point that corresponds to Yo as Y1, and as it goes toward the Ym direction have it go as Y2, Y3, Y4 ... Yi, Yi+1, Yi+2, ... Ym. Have the point that corresponds to Yoo as Y11, and as it goes toward the Ym direction have it go as Y22, Y33, Y44 ... Yii, Yii+1, Yii+2, ... Ym. When having all of the above supposed, the lowest temperatures out of all these points are the lowest temperatures of the yolk and albumen at that time.

Thus, the TLw and TLy below become the lowest temperatures of the yolk and albumen and they can be the temperature of a single or multiple point.

$$TLw(t) = \text{MIN } T(t)(W1, W2, \ldots Wm, Wm+1, Wm+2, \ldots Wi, \ldots W11, W22, \ldots Wmm+1, Wmm+2, \ldots, Wii)$$

$$TLy(t) = \text{MIN } T(t)(Y1, Y2, \ldots Yi, Yi+1, \ldots Y11, Y22, \ldots Yii+1, Yii+2, \ldots Ym)$$

TLw is the albumen's lowest temperature at a certain time from the beginning to end of pasteurization.

TLy is the yolk's lowest temperature at a certain time from the beginning to end of pasteurization.

MIN $T(t)$ is the lowest temperature at t seconds.

t would be the time, its unit being second ($0 < t \leq 11,640$)

Through the pasteurization process which also includes the refrigeration process, pasteurization will be done according to the planned temperature and time at desired pasteurization level out of the lowest temperature and time set that fulfills the conditions below. The planned pasteurization temperature of the yolk and albumen at the point it reaches the planned temperature must not be lower than the lowest temperature at a certain point and at a certain time of a yolk or albumen. The yolk being line F3 and the range above, thus being the range between F1 and F3; the albumen being line F7 and the range above, thus being the range between F4 and F7, the pasteurization time needed must be maintained in the level the planned temperature intends.

Thus it must fulfill the conditions below.

$$Twp(tw) \leq \text{MIN } T(tw+k1)(W1, W2, \ldots Wm, Wm+1, Wm+2, \ldots Wi \ldots W11, W22, \ldots Wmm+1, Wmm+2, \ldots, Wii) \quad 1)$$

$$Typ(ty) \leq \text{MIN } T(ty+k2)(Y1, Y2, \ldots Yi, Yi+1, \ldots Y11, Y22, \ldots Yii+1, Yii+2, \ldots Ym) \quad 2)$$

At the ending time of pasteurization, k1−tw and k2−ty must be larger than the required time at the planned pasteurization temperature of albumen and yolk respectively intended by FIG. 1's level of pasteurization. 3)

(However, $0 \leq k1 \leq 11,640$, $0 \leq k2 \leq 11,640$ and k1, k2 is in the unit of seconds.)

In the mentioned equation,

Twp is the planned pasteurization temperature of the albumen tw is the time (seconds) pasteurization begins after entering the range of the albumen's planned pasteurization temperature k1 is the lapse time (seconds) before the completion of pasteurization after entering the range of the albumen's planned pasteurization temperature MIN $T(tw+k1)$ is the albumen's lowest temperature at each time from after entering the lowest temperature until the completion Typ is the planned pasteurization temperature of the yolk ty is the time (seconds) pasteurization begins after entering the range of the yolk's planned pasteurization temperature k2 is the lapse time (seconds) before the completion of pasteurization after entering the range of the yolk's planned pasteurization temperature MIN $T(ty+k2)$ is the yolk's lowest temperature at each time from after entering the lowest temperature until the completion.

As mentioned above, the pasteurization according to the present invention must have the lowest temperature as the standard. When pasteurizing with a heating medium to heat, shift and refrigerate, the pasteurizing results differ according to what time and what point of temperature is the standard of pasteurization. Therefore, the lowest temperature of each time through the pasteurization process must be the standard, and the measuring point of that lowest temperature must be set.

Therefore, many points must be measured and the lowest temperature out of the points must be the standard of pasteurization. It is wise to measure at least 3 or more points of each of the yolk and the albumen and set the lowest temperature out of them as the standard temperature for pasteurization.

The following is a detailed description of the various operations and drawings that are applied to the invention.

Pasteurizing Process

When reaching the planned temperature with 1 heating medium, the temperature of the means of heating is adjusted so that the lowest temperature of the yolk and albumen can be maintained at or above the planned temperature for the needed time of pasteurization. Two or more heating media of the same or different temperature may be used when adding an additional course such as coating or to boost productivity by continuous operations. When using two or more heating media with different temperatures, it is wise to maintain the temperature of the following heating media or means of heating lower than the previous heating medium or means of heating in order to minimize the damage of the function or solidification of the yolk and albumen.

At this time, the last means of heating must be able to adjust or maintain the temperature required by the planned temperature of the yolk and albumen in order to fulfill the level of pasteurization time. This is done to fulfill the needed pasteurization time in the last means of heating with the refrigerating time was subtracted. Also, a low temperature is favorable in the prevention of function damage for the yolk and albumen.

When pasteurizing an egg that is a shell egg, the albumen has the possibility of its function being damaged or being solidified before the yolk reaches the planned temperature or becomes completely pasteurized. In this instance, it is wise to use two or more heating media or adjusting the temperature or exiting and entering shell eggs in single heating media. At this time the albumen near the shell rapidly loses its temperature and is effective for the prevention of solidifying, yet it must be seen with great caution that there is no break away below the planned temperature.

Particularly, for the early reaching of the planned pasteurizing temperature, heating medium number one which has a high temperature is used, or adding the preheating process which narrows the temperature difference between an egg that has first contacted a heating medium to minimize shell breakage problems (cracks), or when adding a process such as coating, the use of two or more means of heating media is required. Also in this instance, shifting eggs among the heating media is required, but be ensured that no point of the egg's interior breaks away from the planned temperature while shifting.

In order to minimize the albumen's function damage, it is wise for the eggs to enter the planned temperature through the high temperature heating medium number one and then maintaining and completing the pasteurization with a lower number two and number three means of heating regardless the kind and number of the means of heating and heating medium and method of heating. The pasteurization according to the present invention ensures that the lowest temperature of the yolk and albumen fulfills the intended level of pasteurization above the F1~F7 range by maintaining the needed pasteurization temperature and time above the planned pasteurization temperature.

Therefore the pasteurization results differ according to what time, what point, and what temperature is the standard in pasteurization. In severe cases the albumen can be not pasteurized even if the yolk has been, and parts of the yolk can be not pasteurized even if the center of the yolk is pasteurized. These problems cannot be solved when the lowest temperature is not the standard and the lowest temperature measuring point is not set through the entire pasteurization process.

For this, there is a need for measuring the temperature of as many points possible to have as the pasteurization standard. It is wise to measure as many points as possible and have the lowest temperature among them as the pasteurization standard. At least 3 or more points of the yolk and albumen must be according to FIG. 2's principle and the lowest temperature among them must be the standard temperature of the pasteurization.

If that temperature is not the lowest temperature the actual lowest temperature point or other points could not be pasteurized. The temperatures of the yolk and albumen are different even when the temperature of the heating medium is fixed. The following illustrates such an instance and the temperature measuring was done with a waterproof digital electric thermometer with an attached temperature perception needle. The passage entered by the needle into the shell was sealed with a silicon based adhesive.

FIG. 3 illustrates the temperature change of the yolk and albumen after heating. It is a graph that illustrates the 1 minute interval change in temperatures of each of the yolk and albumen of a 60 gram brown egg (albumen's pH concentration 8) kept in 25° C. and then heated in water of 58.5° C.

The data analysis of the temperature changes of the yolk and albumen after heating according to the exemplification research can be referred in Table 1.

TABLE 1

| Temperature | Albumen (White) | | | Yolk | | |
|---|---|---|---|---|---|---|
| (Min) | Wo | Wm | Wl | Yo | Ym | Yi |
| 1 | 46.5 | 42.6 | 39.2 | 35.8 | 31.0 | 34.0 |
| 2 | 51.3 | 47.1 | 43.6 | 42.0 | 33.8 | 39.2 |
| 3 | 53.3 | 50.2 | 47.1 | 45.2 | 37.4 | 42.8 |
| 4 | 54.4 | 51.8 | 49.2 | 47.9 | 40.5 | 45.3 |
| 5 | 55.1 | 53.2 | 50.8 | 49.7 | 43.1 | 47.3 |
| 6 | 55.6 | 53.8 | 52.0 | 51.0 | 45.2 | 49.0 |
| 7 | 56.1 | 54.5 | 53.2 | 52.0 | 47.0 | 50.2 |
| 8 | 56.3 | 55.1 | 53.9 | 53.0 | 48.6 | 51.2 |
| 9 | 56.6 | 55.2 | 54.3 | 53.6 | 49.9 | 52.1 |
| 10 | 56.7 | 55.6 | 54.8 | 54.1 | 51.0 | 52.8 |
| 11 | 56.9 | 55.7 | 55.1 | 54.7 | 51.9 | 53.5 |
| 12 | 57.0 | 56.1 | 55.4 | 55.1 | 52.9 | 54.0 |

TABLE 1-continued

| Temperature | Albumen (White) | | | Yolk | | |
|---|---|---|---|---|---|---|
| (Min) | Wo | Wm | Wl | Yo | Ym | Yi |
| 13 | 57.2 | 56.2 | 56.0 | 55.5 | 53.5 | 54.6 |
| 14 | 57.3 | 56.3 | 56.4 | 55.8 | 54.2 | 55.0 |
| 15 | 57.3 | 56.3 | 56.5 | 56.1 | 54.6 | 55.4 |
| 16 | 57.4 | 56.4 | 56.6 | 56.3 | 55.0 | 55.7 |
| 17 | 57.4 | 56.6 | 56.7 | 56.4 | 55.3 | 55.9 |
| 18 | 57.4 | 56.7 | 56.9 | 56.7 | 55.6 | 56.1 |
| 19 | 57.5 | 56.7 | 57.0 | 56.7 | 55.8 | 56.3 |
| 20 | 57.5 | 56.8 | 57.1 | 56.8 | 56.1 | 56.4 |
| 21 | 57.5 | 56.8 | 57.2 | 56.9 | 56.2 | 56.5 |
| 22 | 57.5 | 56.9 | 57.3 | 57.1 | 56.4 | 56.6 |
| 23 | 57.5 | 57.0 | 57.4 | 57.1 | 56.5 | 56.8 |
| 24 | 57.5 | 57.1 | 57.5 | 57.1 | 56.6 | 56.9 |
| 25 | 57.5 | 57.2 | 57.6 | 57.2 | 56.7 | 56.9 |
| 26 | 57.5 | 57.2 | 57.7 | 57.2 | 56.8 | 57.0 |
| 27 | 57.5 | 57.2 | 57.7 | 57.2 | 56.9 | 57.0 |
| 28 | 57.5 | 57.3 | 57.7 | 57.3 | 57.0 | 57.1 |
| 29 | 57.5 | 57.3 | 57.7 | 57.3 | 57.0 | 57.1 |
| 30 | 57.5 | 57.3 | 57.7 | 57.3 | 57.0 | 57.2 |
| 31 | 57.5 | 57.4 | 57.7 | 57.4 | 57.1 | 57.2 |
| 32 | 57.5 | 57.3 | 57.8 | 57.4 | 57.1 | 57.2 |
| 33 | 57.5 | 57.3 | 57.8 | 57.4 | 57.1 | 57.3 |
| 34 | 57.5 | 57.4 | 57.7 | 57.4 | 57.2 | 57.3 |
| 35 | 57.5 | 57.3 | 57.8 | 57.5 | 57.2 | 57.3 |
| 36 | 57.5 | 57.4 | 57.7 | 57.5 | 57.2 | 57.3 |
| 37 | 57.5 | 57.4 | 57.7 | 57.5 | 57.2 | 57.3 |
| 38 | 57.6 | 57.4 | 57.7 | 57.5 | 57.2 | 57.4 |
| 39 | 57.6 | 57.4 | 57.8 | 57.5 | 57.3 | 57.4 |
| 40 | 57.6 | 57.4 | 57.8 | 57.5 | 57.3 | 57.4 |
| 41 | 57.5 | 57.4 | 57.8 | 57.5 | 57.3 | 57.4 |
| 42 | 57.5 | 57.4 | 57.7 | 57.6 | 57.3 | 57.4 |
| 43 | 57.5 | 57.4 | 57.7 | 57.6 | 57.3 | 57.4 |
| 44 | 57.5 | 57.4 | 57.7 | 57.6 | 57.3 | 57.5 |
| 45 | 57.6 | 57.4 | 57.8 | 57.6 | 57.4 | 57.5 |
| 46 | 57.6 | 57.4 | 57.8 | 57.6 | 57.4 | 57.5 |

As shown in Table 1 and FIG. 3, the temperatures of each point change as time passes and it can be seen that such changes do not have a fixed sequence of being high or low. There is an instance where as time passes, Wi, which is far from the heating medium, is rather higher than Wm or Wo, and the yolk has a higher temperature than the albumen. This appears to be a heat compression of the yolk and albumen which is relevant to the effect of insulation on the transmission of heat caused by the existence of the shell, the yolk's membrane, and the albumen's membrane. There are instances where among points, the yolk's temperature is higher than the albumen's temperature or the inner albumen's temperature is higher than the outer albumen. Therefore, in order for the egg's interior to be completely pasteurized, the pasteurization standard is the lowest temperature through the entire pasteurization process. The lowest temperature must not be lower than the lowest temperature of other points from the beginning to end of the pasteurization.

The example above is the instance of a fresh egg that has just been laid a pH concentration of 8 and the center of the yolk Ym is near the geometric center. As time passes following the egg laying, the yolk shifts near the air cell through respiration. If the egg is kept at room temperature in the summer, after around 2 weeks, Yoo of FIG. 2 will near the air cell part of the shell. In this instance, Ym also breaks away from the egg's geometric center and Yo rather is located near the center. In this instance if a 60 g egg that has been kept in 23~27° C. room temperature for 2 weeks after it has been laid and pasteurized through heating medium with 58.5° C. ,after Ym has reached the planned pasteurization temperature of 54° C., Ym's temperature is higher than Yo from 0.2° C.~0.4° C. Therefore inevitably having the temperature the yolk's center point Ym as the standard, when pasteurizing, even if the yolk's center and Ym is pasteurized, it must be made sure that the yolk's other points or Yo is not pasteurized.

When heat pasteurizing a shell egg that has its yolk close to the shell, the temperature of the yolk's center becomes higher than other parts of the yolk disregarding the heating medium, heating temperature, and heating method. As a result, the portions that are far from the air cell may not be pasteurized even if the yolk's central portion is pasteurized. Only the pasteurization of the points of the lowest temperatures fulfils pasteurization of the entire egg. Therefore the lowest temperature must be the standard of pasteurizing.

FIG. 4 illustrates the yolk's temperature changes according to the refrigeration time. It is the instance of a 60 g brown egg that has been kept at 25° C. room temperature and heated in water at 58.5° C. After 44.7 min has passed since the water heating medium it is taken away from the water and at 25° C. it displays the yolk's temperature change with a 30 second gap as it refrigerates.

Should 57° C. be the planned pasteurization temperature, when Ym, the yolk's lowest temperature point, reaches the planned temperature in 28 min 30 seconds and plans pasteurization at a 5 LOG level, it would continue the 16.7 min that is required for pasteurization. And after it contacts the heating medium the pasteurization will be completed in 45.2 min (refrigerating process included) (In this instance, after breaking away from the heating medium, after 1.5 min passed of the refrigerated process is completed). Even in the refrigerated process the yolk's lowest temperature is at 57° C. for or over 1.5 min and this time must be included. And in the actual heating medium, the heating time can be reduced to around 1.5 min.

Should the planned temperature be 57° C. and the heating medium's temperature be adjusted to maintain Yi, Yo, Ym at 57° C. or near that temperature, a temperature reversal between Ym and Yo will occur in the refrigerated process. Moreover, the time it takes to maintain the planned temperature of 57° C. will take as much as 60 seconds longer for Ym than Yo. In this instance, if the heating or the temperature controlling method of the heating medium makes the difference in Ym and Yo's reaching of the planned temperature 57° C. less than 60 seconds, other parts of the yolk including Yo may not be pasteurized even if the center is.

In the above instance, if refrigerating after breaking away from the heating medium after 44 minutes, the yolk's center (Ym) will be 57° C. or above and the time it takes to maintain will be 1.5 min. This fulfills the time needed for pasteurization of 16.7 (44−28.5+1.5=17) min, yet when refrigerating the outer (Yo) it takes 0.5 min at 57 or above and does not fulfill the 16.7 min. Thus the pasteurization would be an insufficient pasteurization and therefore the time including the refrigerating and the lowest temperature is needed. This sort of refrigerating process is essential and the situations above will undoubtedly occur though the degree will vary. The not pasteurized range may increase according to the setting of the planned pasteurizing temperature.

FIG. 5 illustrates the temperature change of the yolk by time when shifting between the heating media. When a 60 g brown egg kept at 25° C. room temperature breaks away from the $1^{st}$ heating medium of 59° C. when the yolk reaches the lowest temperature of 57.5° C., it shifts to the $2^{nd}$ heating medium of 57.5° C. As it shifts it inevitably is exposed to the air for 1 min, and every 30 seconds, its temperature is measured.

Pasteurization has not yet been completed (When completed, shifting is unnecessary), if the planned pasteurization temperature is 56° C., Ym and Yi proceeds within the planned temperature yet Yo already has broken away from that range and has the possibility of not being pasteurized. If the planned pasteurization temperature is 56.5° C., Yi and Yo may not be pasteurized because they have already broken away from the planned temperature yet not for Ym.

The pasteurization method using the temperature's fall like these sort of shifting through the heating media to the lower temperature heating medium or exiting and reentering through one heating medium when the planned temperature is reached, is efficient and needed. In this instance, even if the yolk's center is pasteurized, there is a chance that the other parts have not been pasteurized. The above is an example. Pasteurization through 2 or more of heating media or through single heating medium not at the same temperature or the repeat of a exiting and entering is needed (when combining an additional process such as coating), it will most certainly occur, although the degree will vary. Therefore, the notion of a lowest temperature classified by time is needed.

More specifically, the desirable pasteurization method of preventing the excessive pasteurization and ripening of the albumen on the one hand and pasteurizing the yolk on the other is the following. When heating or refrigerating an egg, the method is to use the difference of the temperature change of the yolk and albumen as time passes. That is, utilizing the fact that albumen is heated and cooled faster than yolk. When using a single temperature heating medium for this, there is a need for the repeat of entering and exiting. A wiser approach would be to use 2 or more of heating media with different temperature and in this case the previous one must have a higher temperature than the next. Thus with the heating medium that has a higher temperature, the planned temperature can be reached at a quicker time and then shifted to the heating medium that has a lower temperature. When shifting, it uses the amount difference of the yolk and albumen in their change of temperature to prevent the albumen's ripening and to fulfill the time needed for the yolk's pasteurization. Inevitably for both instances, the temperature change of the egg's interior while shifting is essential and there is an occurrence of a temperature reversal among the yolk's points. In FIG. 2 where the yolk's Yoo does not fulfill the time needed to pasteurize and breaks away from the pasteurization condition, there occurs an instance of Ym continuously fulfilling the pasteurizing condition within the pasteurizing temperature. Thus, even if the yolk's center is pasteurized, there is an instance where other points are not pasteurized.

In severe cases, a point of the yolk (Yoo of FIG. 2) breaks away from the pasteurizing temperature range of 54° C. and increases the tolerance of the SE so that even if it re-enters the pasteurizing temperature, pasteurizing cannot be carried out. Also in this instance, Ym can fulfill the needed pasteurizing time within the planned pasteurizing temperature and be pasteurized. Therefore the entire pasteurization of an egg's interior can be ensured through pasteurizing with the lowest temperature as the standard. Thus, when an egg is exciting and entering a single heating medium with the same temperature, and when an egg is shifting between two or more heating media with the same or different temperature, the lowest temperature change as it has contact with the air or other medium must be reflected. This sort of entering, exiting, and shifting can prevent the albumen's ripening and is an effective and needed method to attain the aimed pasteurization level.

FIG. 6 is a graph that illustrates the change in the low st temperature of the yolk and albumen classified by time. A 60 g brown with a pH 8 albumen (the lowest temperature of the albumen and yolk is 24.1° C. and 24.4° C. each) is put in a 59.5° C. heating medium number 1 and when the yolk's lowest temperature rises and reaches around 57° C., it is exposed to the air. Then it is shifted to a 57.5° C. heating medium number 2 and the lowest temperature of the yolk and albumen is measured every minute.

If the planned pasteurizing temperature is 54° C., the yolk and albumen's pasteurizing conditions can be all fulfilled. Yet if the planned pasteurizing temperature is 55° C., the albumen's pasteurizing conditions cannot be fulfilled. If the planned pasteurizing temperature is 56° C., all the pasteurizing conditions cannot be fulfilled because the yolk and albumen have already broken away from the lowest required temperature.

Generally the yolk's pasteurization mostly fulfills the albumen's pasteurizing conditions yet the above instance displays that it does not happen all the time. Even when repeating the process of exiting and re-entering the heating medium for coating inside a heating medium with the same temperature, although there is a difference in the degree, a similar instance can be seen. Thus, the albumen can break away although the yolk is within the planned temperature.

Therefore, a notion of a lowest temperature for each time is needed of the yolk and albumen.

Instance of Pasteurization

When viewing the pasteurizing process of a 60 g brown egg with a pH 8 at a 9 LOG level, it is exposed in the air of 26° C. with a humidity of 63% for 30 min. The heating medium is 59° C. and can adjust the temperature up to ±0.1° C. When putting the egg in the heating medium, the lowest temperature of the albumen and yolk is 18.1° C. and 17.4° C. each and the planned temperature is set at 58° C. The temperature of the heating medium was adjusted so that the lowest temperature of the yolk and albumen could be maintained within the same water tank when it was reached.

As for the albumen's lowest temperature, after it enters the heating medium, it reaches 58° C. after 31.5 minutes and the pasteurization is completed in 35.9 min including the needed 4.4 min. As for the yolk's lowest temperature, after it enters the heating medium, it reaches 58° C. after 37.8 min and the pasteurization is completed in 55.5 min including the needed 17.7 min. At this time, it is 55.5 min including the 1.3 min of stagnation above 58° C. when refrigerating after exiting the heating medium. After the pasteurization, the albumen is a bit opaque.

Thus, after exiting the heating medium, taking the 1.3 min of continuous pasteurizing time into consideration, the pasteurization is completed after exiting the heating medium at 54.2 min.

In the above instance, there was no shift between the water tanks, nor exiting or re-entering the heating medium to do additional procedures such as coating and the temperature after the yolk and albumen reached the planned pasteurizing temperature was maintained. Thus, there was no break away from the lowest temperature, and there was merely the change in the point of the yolk's lowest temperature and time difference in the maintaining of that temperature. If shifting to the next heating medium or there is a rapid fall in the heating temperature, the yolk and albumen's lowest temperature must not break away from the planned temperature. Additionally the lowest temperature of the changed lowest temperature point must fulfill the time needed to maintain the pasteurization.

Pasteurization takes 17.7 min in time as the yolk's lowest temperature at 58° C. in the pasteurization level of 9 LOG requires such time. The time is the same with no concern with the heating medium or its method, yet in the instance above, the entire time for pasteurization is 55.5 min. When pasteurizing at the same temperature, the entire time for pasteurizing differs according to the means of heating, heating medium, heating method, and the egg's characteristics. Even in the same level of pasteurization, the actual pasteurizing time may be the same according to the planned temperature, but as mentioned above, the time it takes for the entire pasteurizing process is different according to the pasteurizing environment.

Instance of Pasteurization Inspection

Table 2 concerns 60 experiment eggs that weigh 60 g each, brown, with its albumen's pH being 8. The SE is injected into the albumen and yolk's Wm and Ym at an amount of 100,000 CFU/ml each. The heating medium is set at 58.5° C., and the 60 eggs, which the albumen and yolk's lowest temperature is 31.3° C. and 30.4° C. respectively when they first contact heating medium, are put into 5 groups with 12 eggs in each group. Each group has a 60 second difference and the eggs are pasteurized at the planned pasteurizing temperature of 56° C. at a 5 LOG level. Cultured in LB agar, SCP and Rambach agar at 37° C. each for 24 hours. Then, pasteurization is inspected with the positive sample PCR. In the instance above the yolk and albumen have to remain at least 28 min and 7.6 min at 56° C. or above to pasteurize at 5 LOG. In this experiment the yolk and albumen's lowest temperature will reach 56° C. at 12.6 min and 19.8 min respectively after it enters the heating medium. After it reaches the planned temperature, it was maintained.

TABLE 2

| 56° C. Holding Time | Number of Positive Reactions | | Number of Negative Reactions | |
|---|---|---|---|---|
| | Albumen | Yolk | Albumen | Yolk |
| 7 Min | 2/12 | 12/12 | 10/12 | 0/12 |
| 8 Min | 0/12 | 12/12 | 12/12 | 0/12 |
| 26 Min | 0/12 | 2/12 | 12/12 | 10/12 |
| 27 Min | 0/12 | 1/12 | 12/12 | 11/12 |
| 28 Min | 0/12 | 0/12 | 12/12 | 12/12 |

Cracks

One problem when pasteurizing shell egg is the damaging of the egg shell due to the heating. Such damages depend highly on the age of layer when an egg has been laid, feed consumed, temperature inside the layer house, and the temperature difference between the heating medium and egg. An egg that was laid by a layer that was forced to molt needs heating at 54~59.5° C. and for that it needs heating in a direct and indirect method in a heating medium that is at least at or above that temperature. Even in this case 50% of eggs damage their shells and therefore the egg of a layer that has been forced to molt is excluded from the present invention's extent.

When pasteurizing an egg such as the one mentioned above, in order to minimize the problems caused on the egg shell, it is wise to narrow down the temperature difference of the egg and heating medium as much as possible. It is also wise to have a preheating stage with a means of heating before pasteurizing to minimize problems on the cracks of egg shell.

Handling Cracked Eggs

Adding a preheating stage or using the automatic crack detector, which is commercially used at present, does not entirely solve the crack problems concerned with damages on the egg shell. Also, the damage condition depends on the feed consumed, the age of layer when an egg has been laid, and how the egg was kept and pasteurized. Unexpected crack problems may occur in the actual pasteurizing process and in this case, it is wise to use the egg as other pasteurizing usage. Thus, this would mean processing the egg boiled or half-boiled for consumption. Eggs processed in this way are generally treated in half or in parts and consumed for the purpose of nutrition, taste, and visual effect for other products. The value is high when the yolk is located near the center, otherwise it will draw in dislike visual-wise from the consumer and it will extend onto other products and lessen the product quality. Therefore, there is a need to add the method of placing the yolk at the geometric center. In order to do this, the egg needs to be rotated up and down or horizontally at 180 degrees or more inside or outside the heating medium at an axis perpendicular to FIG. 2's Woo and Wo. A wiser approach would be to rotate it perpendicularly yet having it rotate 1 time or more so that it intersects in each direction, making the yolk not be placed in a certain location near the shell due to the centrifugal force. Thus, at 54~100° C., the pasteurizing range is increased to 5~300 min, and 2 or more eggs making 1 or more stacks are carried perpendicularly. They are rotated up and down at 180 degrees or more inside or outside a heating medium, yet it must not rotate in the same direction at more than 720 degrees and intersect rotate by going in the opposite direction one or more times. In this instance also, it breaks away from FIG. 1's pasteurizing temperature range and the egg interior's lowest temperature expands to 100° C. There is ripening or change of matter of the yolk and albumen, yet the pasteurizing level and egg edibility as a food product is satisfactory.

Shell Eggs for Pasteurization

The range of the present invention has the yolk and albumen's lowest temperature as the standard and fulfills the temperature and its maintaining time required by FIG. 1. Therefore, is not influenced by the shell's color, weight, and the temperature of egg storage and applied in the same way.

However, although the pasteurizing time is the same, the more the weight is and the lower of egg's temperature is when it enters the heating medium, the longer the entering time to enter the possible pasteurizing temperature range. Moreover the entire required time will extend longer. A refrigerator egg's pasteurizing time is longer than an egg that has been kept in room temperature, and when the refrigerated egg enters a heating medium with the same temperature, its shell has a higher rate of being damaged by cracks than an egg that has been kept in room temperature. The entire time difference between the refrigerated egg and the egg that has been kept in room temperature differs according to the weight, temperature difference when keeping, and the temperature and method of the heating medium. Yet the lower the temperature of the heating medium is, the longer the entering time of the possible pasteurizing temperature the entire time of pasteurization.

The more the weight, the longer it is to reach the possible pasteurizing temperature. The entire time will also extend and the yolk and albumen will have a higher chance of becoming damaged because it will have longer contact with the heating medium. Therefore, there is a need to select a temperature that will minimize such problem. The refrigerated egg particularly needs a more cautious approach when selecting the temperature and time and also restriction. At present, most egg grading and packing equipments can divide up to ±0.1 g and grade/pack the weight in 1 g units. So when pasteurizing, it is wise to minimize the weight difference by using this.

Mass Production

When actually producing mass-produced commercial eggs that have been pasteurized, the planned means of heating until the refrigeration process, the kind and number of heating media, the temperature, the shifting time within the heating media and required time, the method of heating and so on must be the same. The data obtained through enough repeated experiments serving as a basis, apply it in the actual mass-production. Thus, measure the yolk and albumen's lowest temperature by time and set the time, temperature and procedure of each process so that they will reach the planned pasteurizing temperature and maintain the level of pasteurizing time intended at that temperature. Apply to mass-production.

After pasteurizing, inspect the pasteurization and through a regular and repeated measurement, ensure that there is no fall in the function and no solidification of the yolk and albumen. In order for this to happen, the temperature and the time's numerical value must be adjusted. There also must be a feedback that can minimize an error.

It is wise not only to do a pasteurization inspection but also to do a regular quality measurement of the Haugh Unit, Yolk Index, the weight loss and so forth on which represent the yolk and albumen's quality. However, the shell eggs that are to be pasteurized must be the same kind, flock, have the same days passed since being laid, and have the same pH concentration. The weight difference must be minimized, and it is ideal to pasteurize the egg of the same flock with the same weight and same days passed since being laid together.

If, due to a sudden environment change such as a power failure pasteurizing becomes impossible or there is a break away from the normal pasteurizing conditions such as a lack or pasteurization, excessive pasteurization, or the ripening of the albumen, it is wise to change the eggs commercially for other usage. This is the same as the details mentioned above in handling cracked eggs.

Pasteurizing the Egg Shell

Even the shell is much contaminated with the *salmonella* and germs. The heat transmitted to the yolk or albumen is transmitted through the egg shell, and the heat capacity received by the egg shell is higher than the yolk or albumen. Because the *salmonella* is pasteurized by the heat, the yolk and albumen's pasteurization can be expected to fulfill the pasteurization of the egg shell. Additionally, it can be expected to pasteurize similar germs and harmful microorganisms.

Means of Heating and Heating Medium

The term 'means of heating' in this application implies a heating equipment including the heating medium and for example, can be a water tank and so forth. Moreover, 'heating medium' is intended to imply that the medium transfers heat to the shell egg and makes pasteurization possible. The means of heating and heating medium must transfer heat evenly to the egg, and must be possible to adjust the temperature of the heating medium and yolk and albumen for up to ±0.1 degrees. When adjusting the heating medium's temperature, it includes the indirect, direct, continuous, and intermittent transfer.

A solid, liquid, or gas can be used as the heating medium and when considering the facility and economical efficiency it is wise to use liquids such as water, oil, and salt water. In order to increase the heat transfer efficiency or to equally heat the entire egg, use a chemical mixture such as a surface activator, cause friction between the heating medium and egg, or rotate the egg inside the heating medium.

Having no concern with the means of heating, heating medium, heating source, and heating method, in order to reach the level of pasteurization required by the lowest temperature of the yolk and albumen, the required pasteurizing time must be maintained at the planned temperature. One or two or more means of heating, heating medium, or method of heating may be used. They may be used together yet during the pasteurizing process, after the lowest temperature reaches the planned pasteurizing temperature the shifting within the means of heating or heating medium, or the continuing time of pasteurization including the refrigerating time within the heating medium must fulfill the pasteurizing level of temperature and time.

When fixing the shell eggs inside the solid and rotating or reciprocating them inside the means of heating, this can cause an uneven heating region. Also, the albumen can solidify in parts according to the difference in thermal conductivity. Therefore, there has to be an equal heat distribution between the heating medium and heating method. In order to do this, the uneven heating region needs to be minimized.

In order to increase the heat distribution efficiency of the heating and to equally reach the temperature, the up and down or left to right bubble circulation of perturbation equity can be added inside the means of heating or heating medium.

When pasteurizing, these may not be necessary yet the following are additional wise procedures for the enhancement of pasteurization, production, and quality.

Preheating Process

The main purpose of the preheating process is to minimize the damage of the egg shell. Through the preheating of the refrigerated egg or egg kept in room temperature, the temperature difference will be decreased when the egg enters the heating medium. Additionally there is the planned temperature entering time improvement effect and it is wise to have the temperature of the heating medium and the egg shell within 22° C.

Refrigeration

There is a need for natural refrigeration in the air or forced refrigeration during or after pasteurization. In order to maintain the best egg quality and minimize the growth of the living *salmonella* during refrigeration, the shell eggs remain in 37±3° C. at least and arrive at 5° C. or below as earlier as possible and be kept at this temperature.

When refrigerating, it is wise to use the refrigerating method where there is no insulation or no restriction in the mutual friction and shifting between the eggs and the refrigerating medium.

Drying

In order to prevent the $2^{nd}$ contamination of an egg from harmful microorganisms during or after pasteurization, it is wise for coating. For effective coating, the moisture or alien substances must first be removed from the egg's surface. In both of the instances mentioned above, have FIG. 2's Woo and Wo as the axis and rotated on the side horizontal or up and down perpendicular (Woo and Wo up and down). It is wise to rotate the eggs inside the heating medium or air during or after pasteurization. This particularly is more productive and efficient when the moisture is dried. It is possible to dry an egg at a satisfying level within 30 seconds that has broken away from a 55~60° C. heating medium during or after pasteurization and rotated at a speed of 1 rotation per 30 seconds or above in the air with a 60~80% relative humidity at 15–25° C. However, if there is no rotation, the moisture gathers due to the egg's gravity at the lowest point and accumulates making the drying process alone take 25 min or more.

Coating

Water, salt water, with its main element being water, and other liquids can be used as the heating medium due to their convenience in handling and safety reasons. In this instance water or other liquid substances can dissolve the cuticle on the egg shell surface, which prevent germs, and there is an increased possibility of the egg being contaminated by the *salmonella* and germs again after pasteurizing. The cuticle is on the egg since it is laid yet when the egg is washed or has contact with liquid, the cuticle breaks away form the egg-making it susceptible to the entering of germs. This threatens the quality and safeness of the egg.

Therefore when an egg is pasteurized in liquid, particularly water, it is wise to block the $2^{nd}$ contamination of germs through an alternate protection of coating. To do this, it is wise to coat mineral oil or cooking oil as the cuticle's substitution. Coating after pasteurizing not only prevents the re-contamination of germs but also increases the safekeeping of the egg. This coating process is not necessary yet it is wise to do so, and should be done during pasteurization or before packaging. To equally coat onto the egg shell, the egg shell must be rotated on the side and horizontally by having its axis as FIG. 2's Woo and Wo and be in ample contact with the coating material in the process. The egg's rotating axis must not be exposed from the coating material. Thus, it is wise for the egg's geometric center to be located in the medium of the coating material and the rotation should be at least 1 time horizontally.

Packaging

After pasteurizing the eggs need to be packaged before shipment. The method of modem packaging is that it can automatically package in 6, 8, 10, 12, 15, 18, 20, 24, 30, and 36 units according to weight. The packaging materials are recycled paper, PE, PS, PET and plastic that can be reused after washing/pasteurized. In order to prevent the recontamination of germs, materials that can be sealed are used or vacuum packing is possible.

The Difference Between General Eggs and Pasteurized Eggs

When pasteurizing according to the present invention as mentioned above, the difference between general eggs and pasteurized eggs are as follows.

Figure 7A:
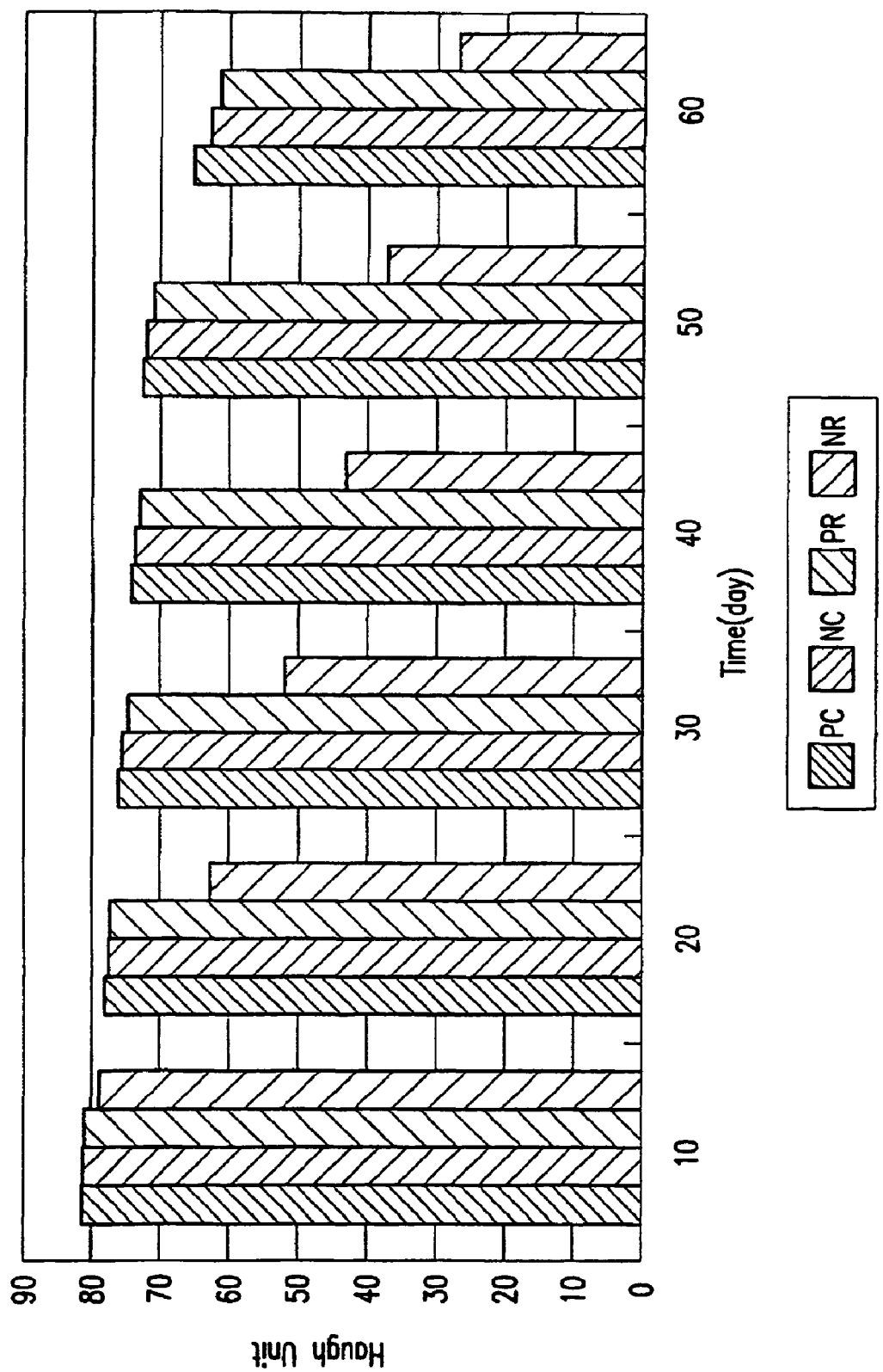
FIG. 7A–7C are graphs that illustrates the condition changes in the eggs that have been pasteurized with the present invention, and general eggs that have not.
Figure 7B:
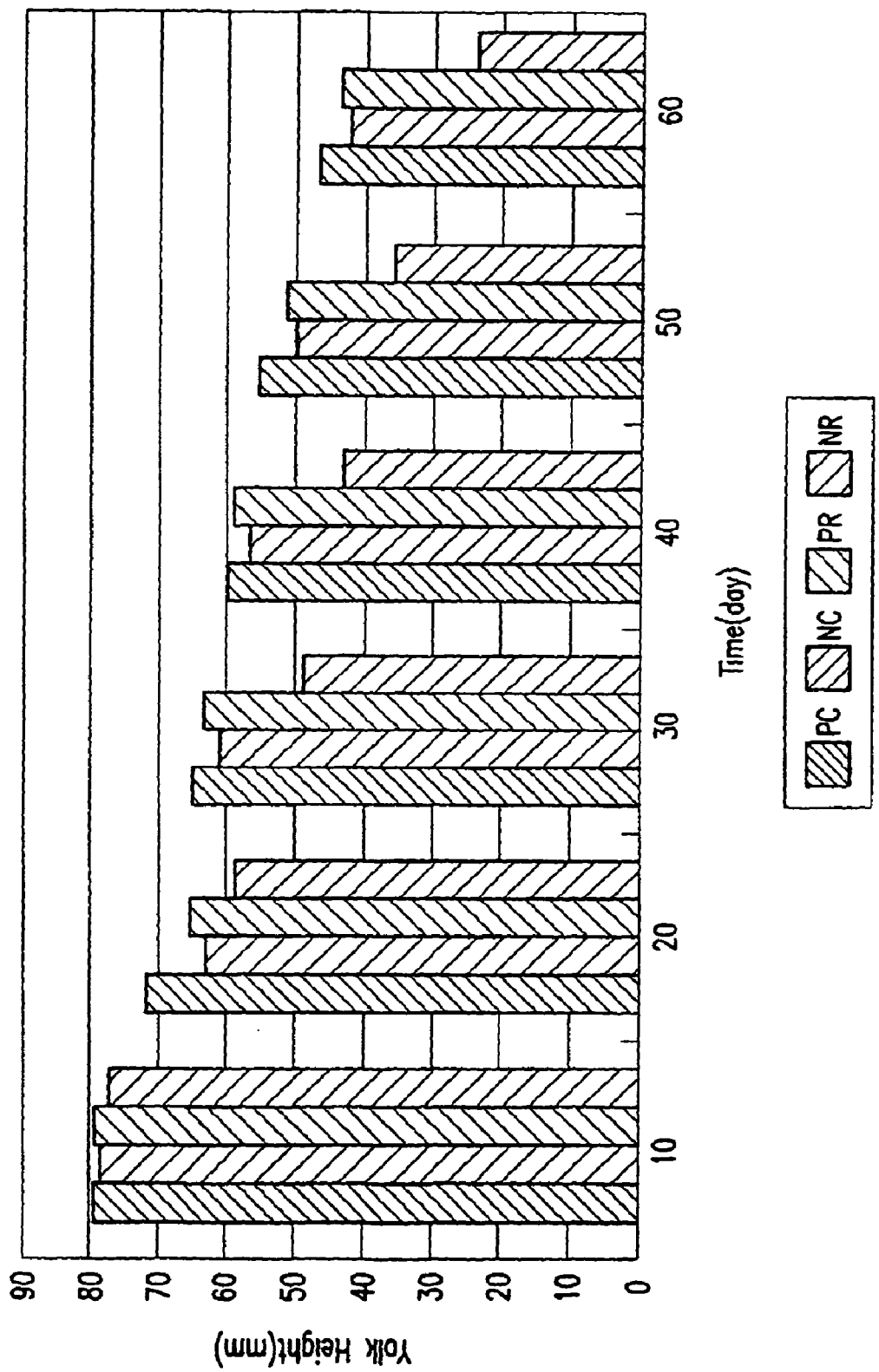
Figure 7C:
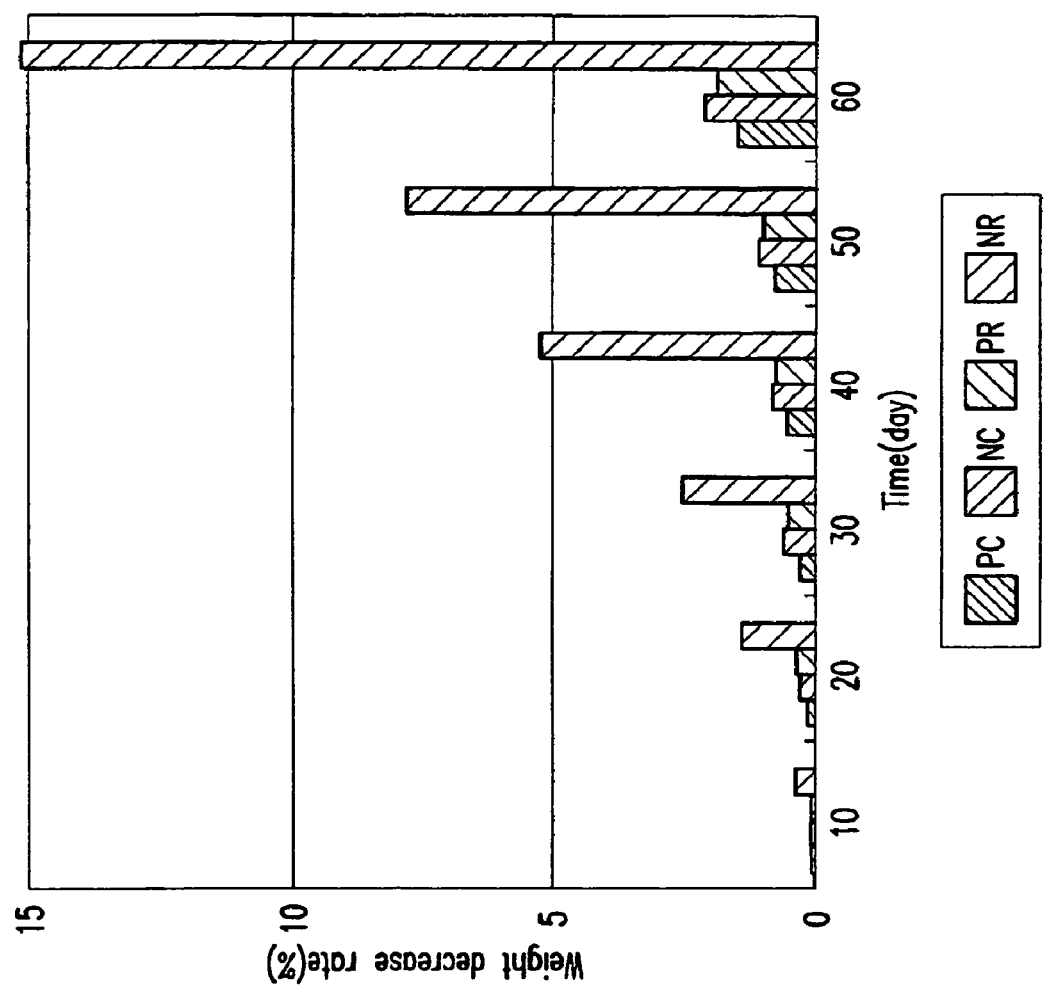

FIGS. 7*a* and 7*c* illustrates the change in the condition of a general eggs and eggs that have been pasteurized as the days pass. The Haugh Unit, the rate of the changes of the weight loss, the Yolk Height was compared and analyzed as the days passed. Haugh Unit is a representing standard of measuring the interior quality of an egg, particularly the albumen. Yolk Height measures the quality of the yolk. Generally eggs are packages according to its weight yet as time passes there are times when they break away from the indicated weight of packing and therefore the loss in weight change was also compared.

It is difficult to spot a difference between a pasteurized egg and one that has not been pasteurized when viewing the egg shell. However, when viewing the yolk and albumen after breaking the shell, in the case of the pasteurized egg, when placing it on a see through glass surface or a clear or bright surface, the albumen looks a bit opaque. The difference of the pasteurized yolk is that it looks a bit larger than an egg that is not pasteurized.

FIGS. 7A, 7B, and 7C illustrates the condition change of the eggs that have been pasteurized according to this research and general eggs. PC (Pasteurized and cold storage) eggs are eggs that are refrigerated (5° C.) after pasteurization, NC (Not pasteurized and cold storage) are eggs that are refrigerated after not pasteurizing them, PR (Pasteurized and Room Temperature) are eggs that are kept in room temperature (24~26° C.) after pasteurizing them and NR (Not pasteurized and Room Temperature) are eggs that are kept in room temperature (24~26° C.) after not pasteurizing them The Haugh Unit is measured by an automatic EGG MUTLI Tester(EMT-5200, Robotmation Co., Ltd, Japan) and a manual method (measured by micrometer calipers and equation; Yolk Height=mm; Haugh Unit=100log (Albumen height−1.7 egg weight$^{0.37}$+7.6). The Isa Brown brown eggs with the weight of 60~70 g and albumen's pH concentration of 8 are (1) pasteurized, coated and refrigerated (5° C.) (2) pasteurized, coated and kept in room temperature (around 25±2° C.) (3) not pasteurized and refrigerated (4) not pasteurized and kept at room temperature. The 4 sample categories have 180 each and after every 1, 5, 10, 20, 30, 60 days have passed, the Haugh Unit, Yolk Height, and the average amount of weight is measured and compared.

If water is used as the heating medium or rinse, the cuticle will be lost so to minimize the contamination of outer germs it is general and ideal to coat the surface. Therefore mineral oil was coated on the egg after pasteurization.

The standard for an egg's interior quality according to the Haugh Unit nearly match among Korea, USDA, Japan, and Europe. The highest grade being (Grade AA>72 Haugh units); the next (Grade A 60–72 Haugh units) and the next being (Grade B<60 Haugh units), which is the lowest grade range for edible usage.

When comparing to the mentioned Haugh Unit, especially the eggs that have been kept in room temperature, even if 60 days have passed for an egg that has been pasteurized, it maintains a Haugh Unit of over 60. This is similar to the amount of an egg that has not been pasteurized with 5 days passed, and it highly surpasses in quality in Haugh Units compared to an egg that has not been pasteurized with 10 days passed. The difference becomes even more severe even in refrigeration as time passes. When 60 days pass, there is a numerical value difference of 3% or more. An egg that has been kept in room temperature after pasteurization compared with an egg that has not been pasteurized and kept in refrigeration in Haugh Units displays that they both hold similar numerical value. This shows that the pasteurized egg's interior assessed in Haugh Units has the effect of especially the albumen's quality enhancement. In the circulation system where the grade difference determines the difference in price, there can be expectations of the effect of improvement in gains through a high graded egg.

The Yolk Height, which mostly assesses the yolk's quality, of the pasteurized egg, has a higher numerical value than the egg that has not been pasteurized disregarding if it has been kept refrigerated or in room temperature. The difference increases as time passes. When kept in room temperature for 60 days the numerical value difference is up to 60% and the pasteurized egg kept in room temperature has a higher numerical value than the refrigerated egg that has not been pasteurized.

The weight changes of eggs have significant meaning due to the fact that the eggs are mostly sold according to their weight. Having no concern with the storage temperature, the pasteurized egg has a low weight loss than the egg that has not been pasteurized and having no concern with the storage temperature, the difference in weight loss between the pasteurized egg and egg that has not been pasteurized increases as time passes. When in room temperature for 60 days, there is a weight loss difference of over sevenfold. Even in the case of a refrigerated egg, a pasteurized egg has a 30% quantity loss improvement compared to an egg that has not been pasteurized.

As mentioned above, along with the ensuring as a food product, a pasteurized egg not only has quality yolk and albumen but also has improved the weight loss problem and thus improved the quality in storing. With this, when there is instability in supply and demand and a rapid fluctuation in the egg price, it can be confronted with flexibility and can call for improvement in gains and safeness.

The above mentioned concerning the present invention, within the present invention's technical ideology according to those who are skilled in this technical field, can be applied on other bird eggs such as a quail egg. Various substitutions, modifications, and changes can be made and so the example research and accompanied Figure is not limited.

As mentioned above, when the invention pasteurized the *salmonella*, which inhabit in the shell egg and causes food poisoning within the body, it must pasteurize the yolk and albumen separately. Through the entire pasteurization, the lowest temperature of the lowest temperature point according to the points within the egg's interior is measured and at a pasteurization level of 5~12 LOG, the desired level of pasteurization is reached based on this lowest temperature. This is done so by maintaining the lowest temperature for the required time of the desired pasteurization level. This pasteurizes the *salmonella* within the egg and increases the safeness of the egg as a food product, increases the quality of the yolk and albumen, improves the weight loss problem, makes it easier to confront supply and demand fluctuations with improvement in storing, and increases gains with improved quality. Moreover, through the pasteurizing method mentioned above, it gives the consumer a safe egg and enhances the people's health by the safeness and variety of the egg.

What is claimed is:

1. A method of pasteurizing an in-shell egg having a yolk and albumen using a heating medium, comprising:

connecting the centers of a largest and a smallest sphere that circumscribe the yolk and the egg shell to a center of the yolk with straight lines and making imaginary extension lines on the straight lines;

setting two points of the albumen closest to the yolk on the straight lines, two points of the albumen closest to the shell on the imaginary extension lines, and the centers of the largest and smallest spheres as the albumen's temperature measuring points;

determining a point with a lowest temperature out of a measured temperatures from the albumen's temperature measuring points as the albumen's lowest temperature point;

setting the two points of the yolk that are closest to the albumen on the straight lines, two central points between the yolk's center point and the above two points of the yolk, and the yolk's center point as the yolk's temperature measuring points;

determining a point with a lowest temperature out of the measured temperatures from the yolk's temperature measuring points as the yolk's lowest temperature point; and measuring a temperature at the yolk's and albumen's lowest temperature points at different times and having them as a standard through a pasteurization process to determine a temperature of pasteurization and a required time of pasteurization.

2. The method of pasteurizing an in-shell egg according to claim 1, wherein the lowest temperature points in the egg are in a temperature range of 54~59.5° C.

3. The method of pasteurizing an in-shell egg according to claim 1 or 2, wherein the temperature of the lowest temperature points includes a temperature of a refrigeration process.

4. The method of pasteurizing an in-shell egg according to claim 1, wherein the temperature of the lowest temperature points includes a temperature of the egg's entering and exiting the heating medium and a temperature of the egg's shifting between heating media.

5. The method of pasteurizing an in-shell egg according to claim 1, wherein the heating medium has at least one heating media.

6. The method of pasteurizing an in-shell egg according to claim 1, wherein the pasteurizing temperature is maintained for 4.56~194 min.

7. The method of pasteurizing an in-shell egg according to claim 1, wherein the method has a pasteurization level which reduces the *salmonella* level to 5 Logs or 12 Logs.

8. The method of pasteurizing an in-shell egg according to claim 7, wherein the pasteurizing temperature and time for pasteurization is represented by line F3 of FIG. 1 or the range above this line.

9. The method of pasteurizing an in-shell egg according to claim 7, wherein the pasteurizing temperature and time for pasteurizing is represented by line F7 of FIG. 1 or the range above this line.

10. The method of pasteurizing an in-shell egg according to claim 7, wherein the *salmonella* mentioned is *Salmonella Enteritidis*.

11. The method of pasteurizing an in-shell egg according to claim 1, further comprising rotating the heating medium perpendicularly or horizontally, or perturbing the medium.

12. The method of pasteurizing an in-shell egg according to claim 1, further comprising drying and coating the eggs during or after pasteurization.

13. The method of pasteurizing an in-shell egg according to claim 12, wherein the drying and coating comprises rotating a geometric center of the egg at a speed of 1 or more times per 30 seconds inside the drying or coating medium, perpendicularly or horizontally.

14. A method of pasteurizing in-shell eggs when cracks occur, comprising:
pasteurizing while rotating 2 or more eggs up and down in one or more stacks loaded perpendicularly, for 180 degrees or more and at a temperature of 54~100° C. for 5~300 minutes inside or outside a heating medium on the condition that they do not rotate In the same direction for 720 degrees or more, and that they intersect in the opposite direction at least one time.

* * * * *